(12) United States Patent
Lee

(10) Patent No.: US 11,619,810 B2
(45) Date of Patent: Apr. 4, 2023

(54) HEAD-UP DISPLAY DEVICE AND METHOD FOR VEHICLE

(71) Applicants: HYUNDAI MOTOR COMPANY, Seoul (KR); KIA CORPORATION, Seoul (KR)

(72) Inventor: Hye Jin Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/388,311

(22) Filed: Jul. 29, 2021

(65) Prior Publication Data

US 2022/0308344 A1    Sep. 29, 2022

(30) Foreign Application Priority Data

Mar. 26, 2021   (KR) .................. 10-2021-0039324

(51) Int. Cl.
| | |
|---|---|
| *G02B 27/01* | (2006.01) |
| *B60K 35/00* | (2006.01) |
| *G06K 9/62* | (2022.01) |
| *G06F 3/01* | (2006.01) |
| *B60R 1/00* | (2022.01) |
| *G06V 20/56* | (2022.01) |

(52) U.S. Cl.
CPC .......... *G02B 27/0101* (2013.01); *B60R 1/00* (2013.01); *G06F 3/013* (2013.01); *G06K 9/6201* (2013.01); *G06V 20/56* (2022.01); *B60R 2300/205* (2013.01); *B60R 2300/301* (2013.01); *G02B 2027/014* (2013.01); *G02B 2027/0141* (2013.01)

(58) Field of Classification Search
CPC ........................ G02B 27/0172; G02B 27/01
See application file for complete search history.

(56) References Cited

U.S. PATENT DOCUMENTS

| | | | |
|---|---|---|---|
| 2015/0138087 A1* | 5/2015 | Kim ................... | G02B 27/01 345/158 |
| 2018/0240258 A1* | 8/2018 | Kosaka ............... | G06T 3/40 |
| 2019/0025580 A1* | 1/2019 | Nagano .............. | B60K 35/00 |

FOREIGN PATENT DOCUMENTS

| | | |
|---|---|---|
| KR | 10-2100012 B1 | 4/2020 |
| KR | 10-2104500 B1 | 4/2020 |

\* cited by examiner

*Primary Examiner* — Nan-Ying Yang
(74) *Attorney, Agent, or Firm* — Morgan, Lewis & Bockius LLP

(57) ABSTRACT

A head-up display (HUD) device for a vehicle includes a sensor for detecting a front object of the vehicle, a controller for selecting any one region of a display region preset based on a driver's gaze as a target region for displaying HUD information depending on an overlapping position and a degree of overlap between the display region and the front object, and determining a virtual image forming position of the HUD information and a graphics mode for displaying a virtual image depending on a relative position of the target region in the display region, an HUD generator for generating the HUD information according to the determined graphics mode, and an HUD adjuster adjusting an image forming distance of the HUD information according to the virtual image forming position.

18 Claims, 6 Drawing Sheets

HEAD-UP DISPLAY DEVICE AND METHOD FOR VEHICLE

CROSS-REFERENCE TO RELATED APPLICATION

This application claims the benefit of priority to Korean Patent Application No. 10-2021-0039324, filed on Mar. 26, 2021 in the Korean Intellectual Property Office, which is hereby incorporated by reference as if fully set forth herein.

BACKGROUND

Technical Field

The present disclosure relates to a head-up display device and method for a vehicle.

Discussion of the Related Art

A head-up display (HUD) device for a vehicle is capable of displaying the current state of a vehicle, traffic conditions, directions, driving speed, etc. and is also capable of displaying comprehensive information on the vehicle.

In recent years, research has been underway to realize augmented reality (AR) by combining a real object viewed through a windshield and a virtual image using a head-up display device. AR is a technology that superimposes a three-dimensional virtual object on a real object that a user sees, and is also called mixed reality (MR).

In such a head-up display device, the position (or a virtual image forming position) at which a virtual image is displayed is physically fixed to a specific range. Accordingly, a conventional HUD device is capable of displaying HUD information only for a target object within the specific range, and is not capable of displaying the HUD information because it cannot be matched with the target object at a position outside the specific range.

The information disclosed in the Background section above is to aid in the understanding of the background of the present disclosure, and should not be taken as acknowledgement that this information forms any part of prior art.

SUMMARY

Accordingly, the present disclosure may provide a head-up display (HUD) device and method for a vehicle for improving usability and marketability by adaptively displaying HUD information at multiple image forming distances.

In addition, the present disclosure may provide an HUD device and method for a vehicle for improving usability and marketability by changing the position at which HUD information is displayed and a method of displaying the HUD information based on information on an outer situation with respect to a front object.

In an aspect, the present disclosure provides a head-up display (HUD) device for a vehicle, including a sensor configured to detect a front object of the vehicle, a controller configured to select any one region of a display region preset based on a driver's gaze as a target region for displaying HUD information depending on an overlapping position and a degree of overlap between the display region and the front object, and to determine a virtual image forming position of the HUD information and a graphics mode for displaying a virtual image depending on a relative position of the target region in the display region, an HUD generator configured generate the HUD information according to the determined graphics mode, and an HUD adjuster configured to adjust an image forming distance of the HUD information according to the virtual image forming position.

The sensor may sense a distance and an angle between the vehicle and the front object and may output sensed information as external situation information, and the controller may calculate the overlapping position and the degree of overlap between the display region and the front object based on the external situation information.

The display region may be configured in an equilateral trapezoidal shape having a short side, a long side, and one pair of opposite sides having the same length, the short side may be positioned at a first distance from a windshield of the vehicle, the long side may be positioned at a second position from the windshield of the vehicle, and the first distance may be shorter than the second distance.

The display region may include a first display region defined by a first guide line corresponding to a first image forming distance of the HUD information, a second display region defined by a second guide line corresponding to a second image forming distance of the HUD information, and a third display region defined by a third guide line corresponding to a third image forming distance of the HUD information, the first image forming distance may be longer than the second image forming distance, and the second image forming distance may be longer than the third image forming distance. A first distance between the first display region and the windshield of the vehicle may be longer than a second distance between the second display region and the windshield of the vehicle, and the second distance may be longer than a third distance between the third display region and the windshield of the vehicle.

The controller may calculate an overlap ratio between each of the first and second display regions and a specific position of the front object based on the external situation information.

When the overlap ratio between the first display region and the specific position of the front object is equal to or greater than a preset ratio (%), the controller may select the first display region as the target region and determines the graphics mode as a first mode based on augmented reality (AR), when the overlap ratio between the second display region and the specific position of the front object is equal to or greater than the preset ratio, the controller may select the second display region as the target region and may determine the graphics mode as the first mode, and when the overlap ratio between the second display region and the specific position of the front object is less than the preset ratio, the controller may select the third display region as the target region and may determine the graphics mode as a second mode that is not related to the AR.

The preset ratio may be any one of a range from 20% to 100%.

In the first mode, a display position of the HUD information may be changed in the first display region or the second display region along the front object that is moving for matching with the front object, and in the second mode, the display position of the HUD information may be fixed to a specific position in the third display region regardless of a position of the front object that is moving.

The HUD device may further include an internal memory configured to classify the HUD information for each category depending on an HUD event, wherein the controller may determine a category in the internal memory, to which the HUD information belongs, may calculate the overlap ratio only for displaying some categories, and may omit an operation of calculating the overlap ratio for displaying remaining categories.

The controller may perform control to display any one of the first to third display regions depending on whether first HUD information belonging to a first category is matched with a display region at the overlap ratio, may perform control to display any one of the first to third display regions depending on whether second HUD information belonging to a second category is matched with a display region at the overlap ratio, and may perform control to display third HUD information belonging to a third category only in the third display region regardless of the overlap ratio.

In another aspect, the present disclosure provides a head-up display (HUD) displaying method for a vehicle, including detecting a front object of the vehicle and generating external situation information, calculating an overlapping position and a degree of overlap between a display region preset based on a driver's gaze and the front object based on the external situation information, selecting any one region of the display region as a target region for displaying HUD information depending on the overlapping position and the degree of overlap, and determining a virtual image forming position of the HUD information and a graphics mode for displaying a virtual image depending on a relative position of the target region in the display region, generating the HUD information according to the determined graphics mode, and adjusting an image forming distance of the HUD information according to the virtual image forming position.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
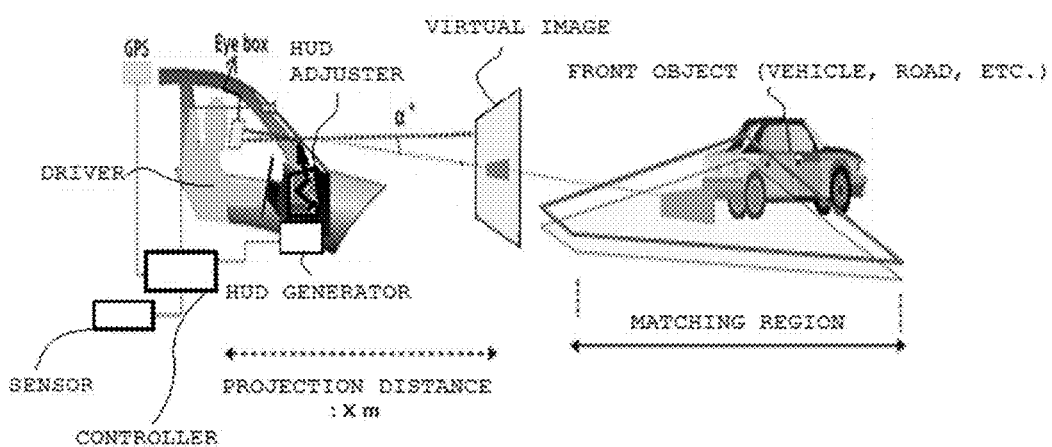
FIG. 1 is a diagram showing an optimal projection distance and a matching region of HUD information in a head-up display (HUD) device for a vehicle according to an exemplary embodiment of the present disclosure.

Hereinafter, the present disclosure will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

With regard to the following description of the present disclosure, in describing positional relationships, phrases such as "an element A on an element B," "an element A above an element B," "an element A below an element B" and "an element A next to an element B," another element C may be disposed between the elements A and B unless the term "immediately" or "directly" is explicitly used.

With regard to the following description of the present disclosure, in describing elements, terms such as "first" and "second" are used, but the elements are not limited by these terms. These terms are simply used to distinguish one element from another. Accordingly, as used herein, a first element may be a second element within the technical idea of the present disclosure.

Hereinafter, an embodiment of the present disclosure will be described in detail with reference to the accompanying drawings.

FIG. 1 is a diagram showing an optimal projection distance and a matching region of HUD information in a head-up display (HUD) device for a vehicle according to an exemplary embodiment of the present disclosure.

Referring to FIG. 1, the HUD device for a vehicle according to an exemplary embodiment of the present disclosure may display additional information (content) that is difficult to see in a real space as a virtual image of the HUD and to simultaneously and clearly view an object in an actual space and HUD content as additional information of the object by matching an image forming distance (or a focal length) of the virtual image of the HUD with a focus of an actual object (a natural landscape, a road/building structure, a vehicle, a pedestrian, etc.) in front of a windshield and synthesizing a virtual image with a real object using augmented reality (AR) technology. Augmented reality (AR) is a field of virtual reality and is a computer graphics scheme of synthesizing a virtual object with a real world to make the virtual object look like an object existing in an original environment. Virtual reality is targeted at a virtual object in a virtual space, whereas AR synthesizes a virtual object on the base of the real world to view additional information that is difficult to see in reality.

AR HUD content needs to be capable of expressing a sense of an actual distance and to have less focus stress. General HUD content is displayed at a fixed position in front of a driver, whereas the focus of the AR HUD content needs to be adjusted depending on the position of a front object. An image projection distance (X m) of FIG. 1 is a distance that is set to minimize a sense of unfamiliarity in focus even if a virtual image and a front object are simultaneously viewed. When the image projection distance (X m) is used, it may be easy to reduce the size and manufacturing costs of the AR HUD device.

An eye box of FIG. 1 may be a virtual region formed to view an HUD image and may display HUD content at an appropriate position according to a difference in the driver's eye level. The eye box may be distinguishably configured in multiple stages in consideration of the driver's eye level.

The matching region of FIG. 1 may be determined depending on the shape and size of the eye box, an image projection distance X, a heading angle α° of the driver, and the driver's gaze. The matching region may be a display region of HUD content. It may be possible to display the HUD content when a target object is present in the matching region, and it may be impossible to display the HUD content when the target object is present outside the matching region.

A sensor of the HUD device in FIG. 1 may detect an external situation of a front object when a subject vehicle travels. The sensor may include a camera and a radar sensor and may detect a driving situation around the subject vehicle through information on the external situation detected by the camera and the radar sensor. In general, the camera and the radar for detecting a driving situation may be arranged toward a front side of the subject vehicle and may be installed at the same position or different positions. Here, the camera may capture an image of a road in front of the vehicle. The camera may employ a charge coupled device (CCD), a complementary metal oxide semiconductor (CMOS)-based image sensor or the like. The radar may emit electromagnetic waves in front of the vehicle and may receive a signal reflected from an object in front of the vehicle to recognize the object in front of the vehicle. The radar may employ an array antenna or the like.

In the present embodiment, the camera and the radar are described as an example of the sensor, but the technical scope of the present disclosure is not limited thereto. Any component may be included in the sensor as long as the component, such as an infrared sensor or a LiDAR sensor, is capable of detecting a driving situation around the subject vehicle.

The driving situation detected by the sensor may include information on a preceding vehicle and information on an intersection for directions. Here, the information on the preceding vehicle may include a central portion of the preceding vehicle, an upper limit of the preceding vehicle, the distance and angle from the preceding vehicle, the width of the preceding vehicle, or the like.

A controller of the HUD device in FIG. 1 may differently determine a position and method for displaying HUD information based on information on an external situation (in particular, a distance and angle from a preceding vehicle), and thus may display HUD information depending on multiple image forming distances, thereby improving usability and marketability of a device.

The controller of the HUD device according to an exemplary embodiment of the present disclosure may be a processor (e.g., computer, microprocessor, CPU, ASIC, circuitry, logic circuits, etc.). Each controller may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The controller may determine a graphics mode as an AR mode (or a first mode) appropriate for forming an image at a long distance when a front object is positioned at a distance equal to or greater than a preset distance, and may perform control to display HUD information in a long-distance region (a target region corresponding to a corresponding position of the front object) of the display region. In contrast, the controller may determine the graphics mode as a general mode (or a second mode) appropriate for forming an image at a short distance when the front object position is positioned at a distance less than the preset distance, and may perform control to display HUD information in a short-distance region (a target region corresponding to a corresponding position of the front object) of the display region.

To this end, the controller may calculate an overlapping position and a degree of overlap between the display region and the front object based on the distance and angle between the vehicle detected by the sensor and the front object. The controller may select any one region of the display region as a target region for displaying HUD information depending on the overlapping position and the degree of overlap between the display region and the front object and may determine a virtual image forming position of the HUD information and a graphics mode for displaying the virtual image depending on a relative position of the target region in the display region.

The HUD information may be classified and stored for each category in response to an HUD event. In this case, the controller may determine a category to which the HUD information belongs and may vary a control sequence for setting a displaying position of the HUD information according to the category. In other words, the controller may calculate an overlap ratio between the display region and the front object only for displaying some categories and may omit an operation of calculating the overlap ratio in order to display the other categories.

The controller may detect a content displaying position in consideration of GUI characteristics of content to be displayed depending on external situation information (that is, a distance and angle from a preceding vehicle, the width of the preceding vehicle, a central portion of the preceding vehicle, etc.) detected by the sensor when an event such as forward collision warning (FCW), or smart cruise control (SCC)

Occurs.

When the FEW event occurs, the controller may detect at least one of the central portion of the preceding vehicle, an upper portion of the preceding vehicle, or a region between the subject vehicle and the preceding vehicle as a content displaying position. When the SCC event occurs, the controller may detect the width of the preceding vehicle or the region between the subject vehicle and the preceding vehicle as the content displaying position.

An HUD generator of FIG. 1 may be embodied as an image processing circuit (e.g., a processor) for generating and processing a virtual image. The HUD generator may generate HUD information according to the graphics mode (an AR mode or a general mode) determined by the controller. The HUD information (content) may include various pieces of content depending on preset events. For example, content to be output when the SCC event occurs may include information on speed of the subject vehicle, an interval from the preceding vehicle, and a request to ensure a distance.

An HUD adjuster of FIG. 1 may adjust an image forming distance of HUD information depending on the virtual image forming position of the HUD information, determined by the controller. The HUD adjuster may adjust an image forming distance (or a virtual image forming distance) of an image output by the HUD generator and may then project the image onto a windshield under the control of the controller. The HUD adjuster may include a combination of at least some of at least one reflective mirror, a convex lens, or a concave mirror, but is not limited thereto.

Figure 2:
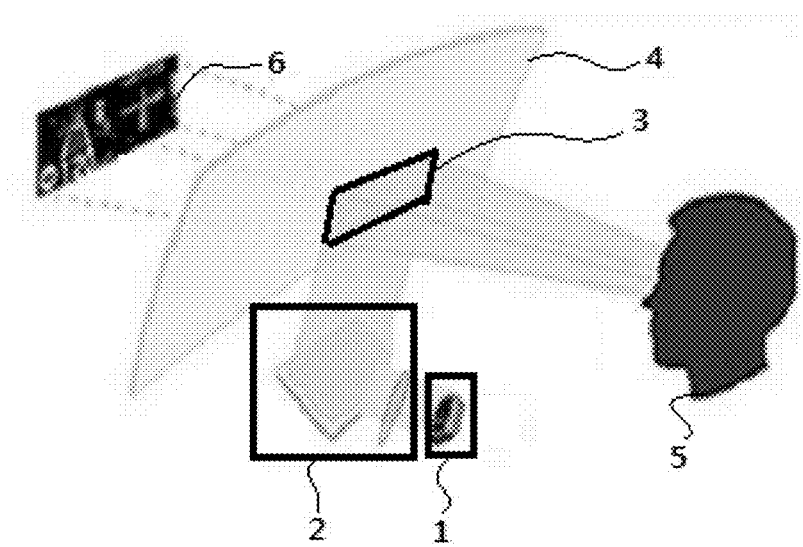
FIG. 2 is a diagram for explaining a principle of adjusting an image forming distance of HUD information by an HUD device for a vehicle according to an exemplary embodiment of the present disclosure.

FIG. 2 is a diagram for explaining a principle of adjusting an image forming distance of HUD information by a head-up display (HUD) device for a vehicle according to an exemplary embodiment of the present disclosure.

Referring to FIG. 2, in the HUD device for a vehicle according to an exemplary embodiment of the present disclosure, an HUD adjuster 2 may adjust an image forming distance of an HUD image 3 input from an HUD generator 1 and may then project the image onto a windshield 4 functioning as a combiner. The HUD adjuster 2 may adjust the image forming distance of the HUD image 3 and may also project the HUD image 3 onto the windshield 4 through magnification and reflection of the HUD image 3 under the control of the controller. A driver 5 may see a virtual image 6 formed outside the windshield 4, and in this case, the virtual image 6 may be positioned at the adjusted image forming distance. The virtual image 6 may include HUD content based on the AR mode or HUD content based on the general mode.

Figure 3A:
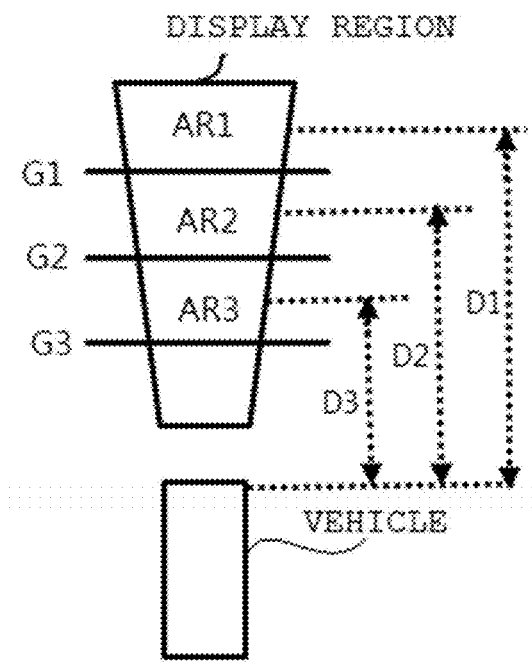
FIGS. 3A and 3B are diagrams showing an example in which a display region for displaying HUD information is divided in an HUD device for a vehicle according to an exemplary embodiment of the present disclosure.
Figure 3B:
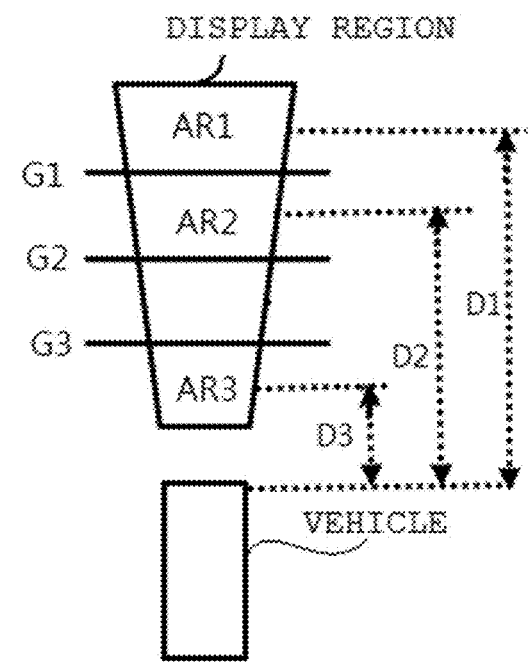

FIGS. 3A and 3B are diagrams showing an example in which a display region for displaying HUD information is divided in an HUD device for a vehicle according to an exemplary embodiment of the present disclosure.

In the HUD device according to an exemplary embodiment of the present disclosure, a display region that is preset based on the driver's gaze may be configured like an equilateral trapezoidal shape having a short side, a long side, and one pair of opposite sides having the same length, as shown in FIGS. 3A and 3B. In the display region, the short side may be positioned at a first distance from the windshield of the vehicle, and the long side may be positioned at a second distance from the windshield of the vehicle. In this case, the first distance may be shorter than the second distance.

The display region may be divided into a plurality of display regions AR1, AR2, and AR3 by a plurality of different guide lines G1, G2, and G3 having different image forming distances.

For example, the display region may include a first display region AR1 defined by a first guide line G1 corresponding to a first image forming distance of HUD information, a second display region AR2 defined by a second guide line G2 corresponding to a second image forming distance of the HUD information, and a third display region AR3 defined by a third guide line G3 corresponding to a third image forming distance of the HUD information. In this case, the first image forming distance may be longer than the second image forming distance, and the second image forming distance may be longer than the third image forming distance. A first distance D1 between the first display region and the windshield of the vehicle may be longer than a second distance D2 between the second display region and the windshield of the vehicle, and the second distance may be longer than a third distance D3 between the third display region and the windshield of the vehicle.

As shown in FIG. 3A, the third display region AR3 may be set to a display region positioned between the second guide line G2 and the third guide line G3, or as shown in FIG. 3B, may also be set to a display region positioned between the third guide line G3 and the vehicle.

Figure 4:
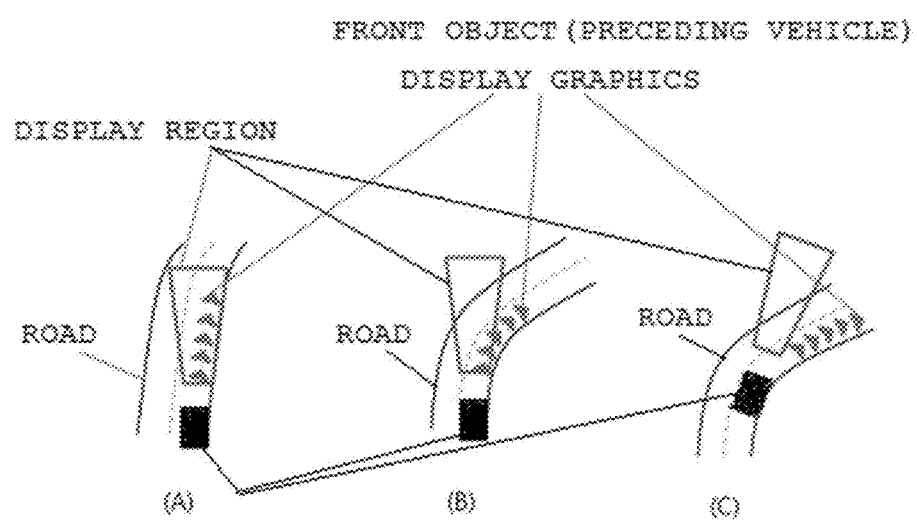
FIG. 4 is a diagram for explaining a phenomenon in which some HUD information items are cut off and is not capable of being displayed due to a front environment (a road situation and movement of a front object) as a comparative example in the present disclosure.

FIG. 4 is a diagram for explaining a phenomenon in which some HUD information items are cut off and is not capable of being displayed due to a front environment (a road situation and movement of a front object) as a comparative example in the present disclosure.

Referring to FIG. 4, when the number of HUD content items to be matched with a preceding vehicle is 5, HUD content items may be displayed or all or some HUD content items may not be displayed depending on the front environment of the preceding vehicle.

In the case of FIG. 4A, because all HUD content items are positioned within the display region, the HUD content items may be normally displayed. In the case of FIG. 4B, because some HUD content items are positioned outside the display region, a phenomenon in which some HUD content items are not capable of being displayed (a phenomenon in which some HUD content items are cut off) may occur. In the case of FIG. 4C, because all the HUD content items are positioned outside the display region, a phenomenon in which all HUD content items are not capable of being displayed may occur.

In contrast, an HUD device for a vehicle according to an exemplary embodiment of the present disclosure may prevent (or minimize) the phenomenon in which some content items are cut off as shown in FIG. 4B or the phenomenon in which content items are not capable of being displayed as shown in FIG. 4B by determining a displaying position of an HUD image depending on an overlap ratio between the display region and the front object and selecting an optimal graphics mode (an AR mode or a general mode) as well as adjusting an image forming distance of the HUD image depending on the determined display position.

Figure 5:
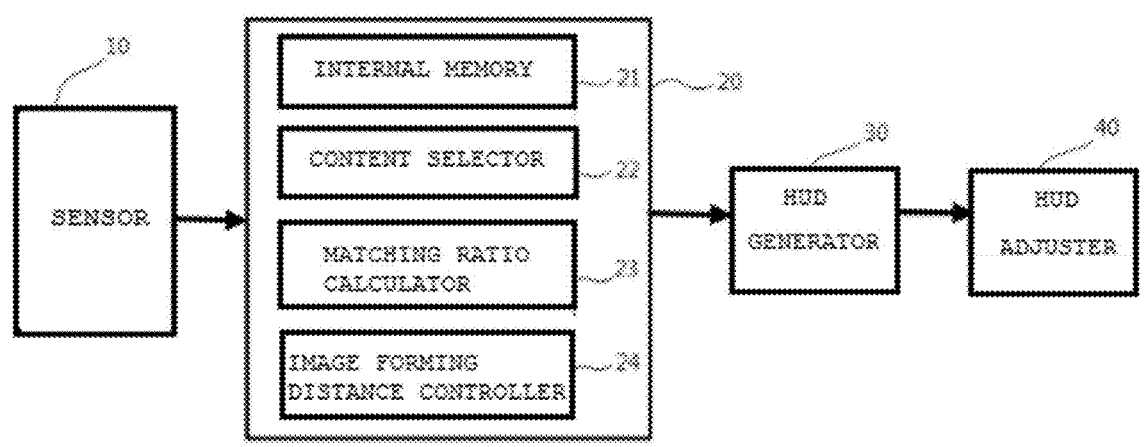
FIG. 5 is a block diagram showing the configuration of an HUD device for a vehicle according to an exemplary embodiment of the present disclosure.
Figure 6:
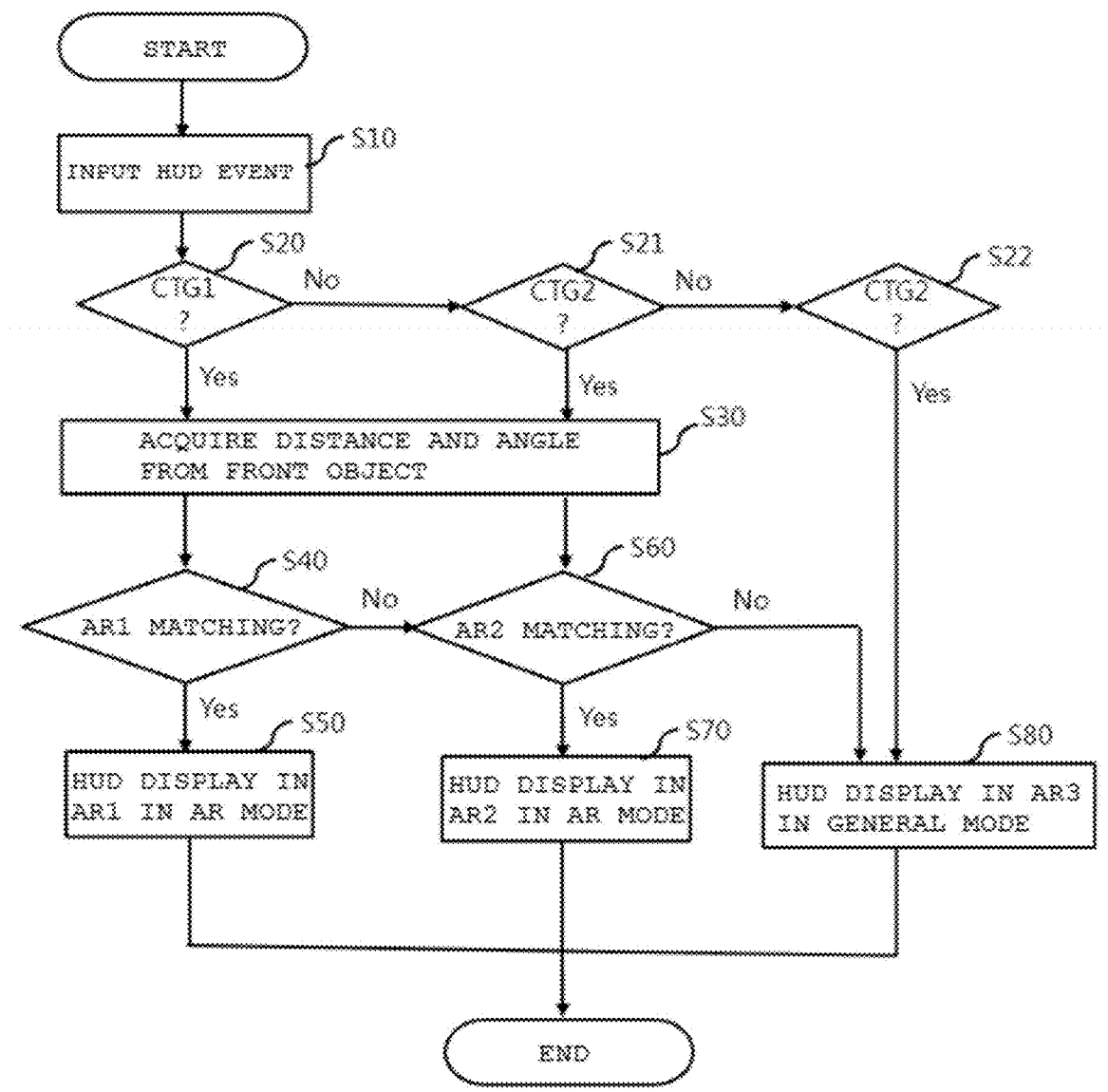
FIG. 6 is a flowchart showing an operation of an HUD device for a vehicle according to an exemplary embodiment of the present disclosure.

FIG. 5 is a block diagram showing the configuration of an HUD device for a vehicle according to an exemplary embodiment of the present disclosure. FIG. 6 is a flowchart showing an operation of an HUD device for a vehicle according to an exemplary embodiment of the present disclosure.

Referring to FIGS. 5 and 6, the HUD device for a vehicle according to an exemplary embodiment of the present disclosure may include a sensor 10, a controller 20, an HUD generator 30, and an HUD adjuster 40.

The sensor 10, the HUD generator 30, and the HUD adjuster 40 may be materially the same as in the description given with reference to FIG. 1.

The controller 20 may calculate the overlapping position and the degree of overlap between the display region and the front object based on the external situation information detected by the sensor 10 and may control the HUD generator 30 and the HUD adjuster 40 according to the calculation result.

The controller 20 may include an internal memory 21, a content selector 22, a matching ratio calculator 23, and an image forming distance controller 24.

The internal memory 21 may store HUD information classified for each category depending on an HUD event. For example, when the HUD event is smart cruise control (SCC), first HUD information belonging to a first category may be a distance bar of an SCC vehicle, second HUD information belonging to a second category may be a vehicle speed setting value, and third HUD information belonging to a third category may be a telephone or a media notification popup.

Upon receiving the HUD event, the content selector 22 may determine a category in the internal memory, to which corresponding HUD information belongs (S20, S21, and S22).

The matching ratio calculator 23 may calculate the overlap ratio between the display region and the front object based on the distance and the angle from the front object acquired by the sensor 10 (S30, S40, and S50). The overlapping rate may be defined as an overlapping area between the display region and the front object/an area of the display region)×100(%). The matching ratio calculator 23 may calculate an overlap ratio only for displaying some categories and may omit an operation of calculating the overlap ratio in order to display the other categories. For example, as shown in FIG. 6, the matching ratio calculator 23 may calculate the overlap ratio (S40 and S60) only for displaying the first HUD information belonging to the first category CTG1 and the second HUD information belonging to the second category CTG2 (S40 and S60) and may omit an operation of calculating the overlap ratio in order to display the third HUD information belonging to the third category CTG3.

When an overlap ratio between the first display region AR1 (refer to FIGS. 3A and 3B) and a specific position (e.g., a rear bumper line) of the front object is equal to or greater than A %, the matching ratio calculator 23 may select the first display region AR1 as a target region and may determine a graphics mode as an augmented reality (AR)-based first mode (i.e., an AR mode) (S40 and S50). In this case, the first display region AR1 may be a virtual image forming position of corresponding HUD information.

When the overlap ratio between the second display region AR2 (refer to FIGS. 3A and 3B) and a specific position of the front object is equal to or greater than A %, the matching ratio calculator 23 may select the second display region AR2 as a target region and may determine the graphics mode as the first mode (S60 and S70). In this case, the second display region AR2 may be a virtual image forming position of corresponding HUD information.

When the overlap ratio between the second display region AR2 and a specific position of the front object is less than A %, the matching ratio calculator 23 may select the third display region AR3 (refer to FIGS. 3A and 3B) as a target region and may determine the graphics mode as a second mode (i.e., a general mode) that is not related to AR (S80). In this case, the third display region AR3 may be a virtual image forming position of corresponding HUD information.

Here, A % may be a reference overlap ratio and may be any one of 20% to 100%. The reference overlap ratio may be preset to any one of 20% to 100% depending on design specifications, a purpose of use, or the like.

In the case of the first mode, a display position of HUD information may be changed depending on a front object within the first display region AR1 or the second display region AR2 for matching with a moving front object (a tracking operation is performed). In contrast, in the case of the second mode, the display position of the HUD information may be fixed to a specific position within the third display region AR3 regardless of the front object (a tracking operation is not performed).

The matching ratio calculator 23 may perform control to display the first HUD information belonging to the first category CTG1 in any one of first to third display regions AR1, AR2, and AR3 depending on whether the first HUD information is matched with a display region at an overlap ratio, may perform control to display the second HUD information belonging to the second category CTG2 in any one of the second and third display regions AR2 and AR3 depending on whether the second HUD information is matched with a display region at an overlap ratio, and may perform control to display the third HUD information belonging to the third category CTG3 only in the third display region AR3 regardless of the overlap ratio.

The image forming distance controller 24 may adjust an image forming distance of HUD information depending on a virtual image forming position of corresponding HUD information by controlling hardware operation of the HUD adjuster 40.

Figure 7:
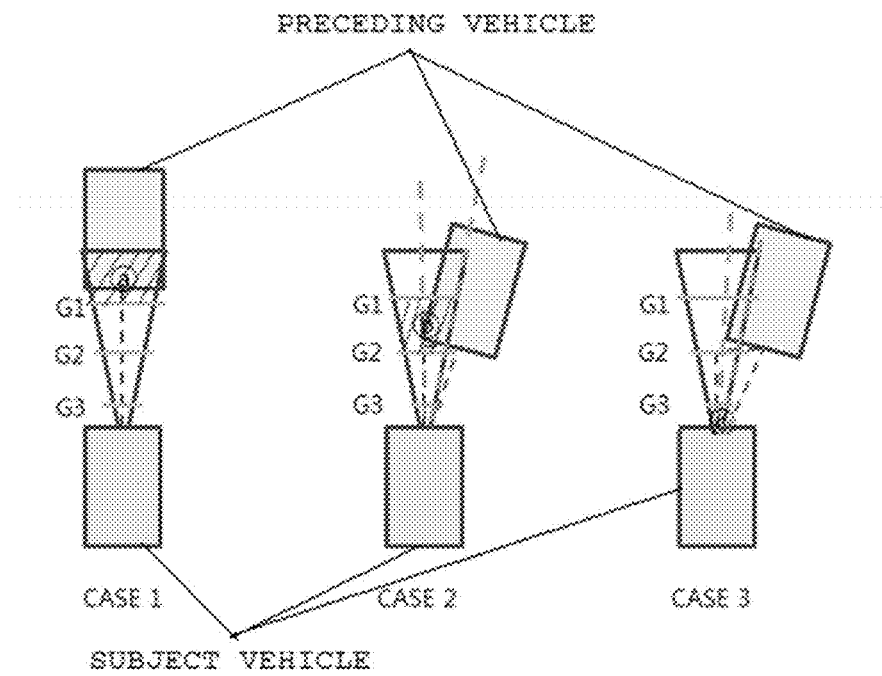
FIG. 7 is a diagram showing an example in which a display position of HUD information and a graphics mode are controlled by recognizing a front environment in an HUD device for a vehicle according to an exemplary embodiment of the present disclosure.
Figure 8:
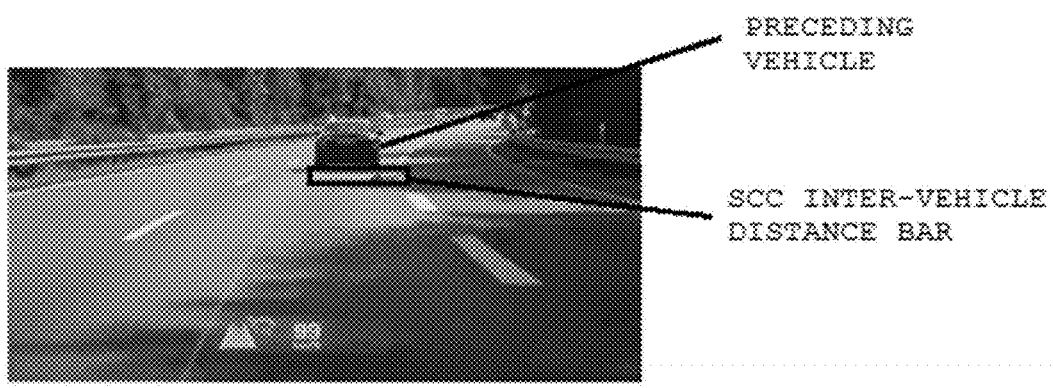
FIG. 8 is a diagram showing an example in which HUD information is displayed with respect to cases 1 and 2 of FIG. 7.
Figure 9:
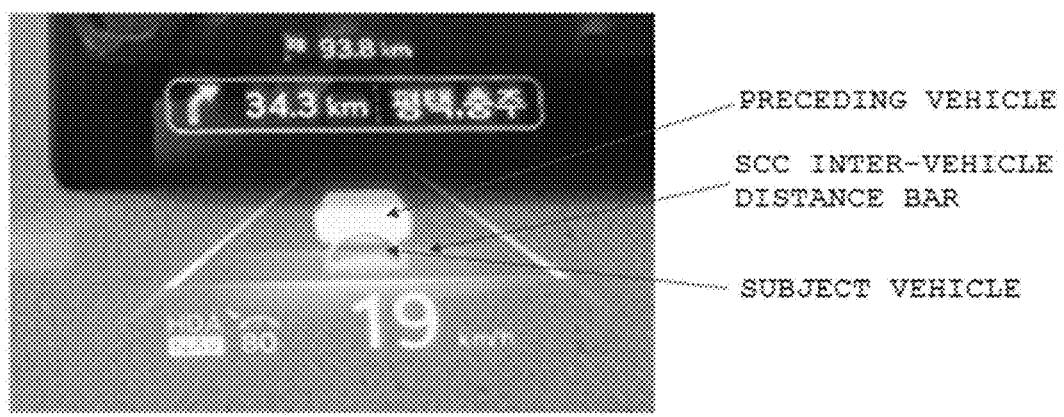
FIG. 9 is a diagram showing an example in which HUD information is displayed with respect to case 3 of FIG. 7.

FIG. 7 is a diagram showing an example in which a display position of HUD information and a graphics mode are controlled by recognizing a front environment in an HUD device for a vehicle according to an exemplary embodiment of the present disclosure. FIG. 8 is a diagram showing an example in which HUD information is displayed with respect to cases 1 and 2 of FIG. 7. FIG. 9 is a diagram showing an example in which HUD information is displayed with respect to case 3 of FIG. 7.

FIG. 7 illustrates a situation in which an SCC inter-vehicle distance bar is matched during an SCC event for each case.

The controller 20 may calculate a matching ratio (or an overlap ratio) only for a first region a and a second region b as a target and may display the SCC inter-vehicle distance bar as an AR mode in the first region a or the second region b as shown in FIG. 8 when a condition is satisfied. In contrast, when the condition is not satisfied as the calculation result of the matching ratio, the controller 20 may prevent (or minimize) the phenomenon in which some content items are cut off or the phenomenon in which content items are not capable of being displayed as shown in FIG. 4 by displaying an SCC inter-vehicle distance bar as a general mode in a third region c as shown in FIG. 9.

The controller 20 may receive information on an angle of the front object (e.g., a preceding vehicle) from the sensor 10, and the information on the angle may include information on longitudinal/transverse coordinates of a specific position (e.g., a rear bumper line) of the front object. For example, the controller 20 may receive coordinates of a center point of a rear bumper line of a preceding vehicle using the center of a front bumper of a subject vehicle as an origin point. A direction of the preceding vehicle may be set based on an angle formed by connecting the subject vehicle and the preceding vehicle in a straight line. The controller 20 may select an overlap section between the rear bumper line of the preceding vehicle and the display region as a target region.

In the case 1 of FIG. 7, a matching ratio between the rear bumper line of the preceding vehicle and the first region a is 100%, and thus the controller 20 may display the SCC inter-vehicle distance bar in the first region a in an AR mode (refer to FIG. 8).

In the case 2 of FIG. 7, the rear bumper line of the preceding vehicle and the first region a do not overlap, and thus the SCC inter-vehicle distance bar may not be displayed in the first region a. In this case, a matching ratio between the rear bumper line of the preceding vehicle and the second region b is equal to or greater than 50% that is a reference value, and thus the controller 20 may display the SCC inter-vehicle distance bar in the second region b in the AR mode (refer to FIG. 8).

In the case 3 of FIG. 7, the rear bumper line of the preceding vehicle and the first region a do not overlap, and thus the SCC inter-vehicle distance bar may not be displayed in the first region a. A matching ratio between the rear bumper line of the preceding vehicle and the second region b is less than 50% that is a reference value, and thus the SCC inter-vehicle distance bar may not be displayed in the second region b. The controller 20 may display the SCC inter-vehicle distance bar in the third region c in a general mode (refer to FIG. 9).

As described above, HUD information may be adaptively displayed at multiple image forming distances to improve the usability and marketability of the HUD device for a vehicle.

According to the present embodiment, the usability and marketability of the HUD device for a vehicle may be improved by varying the display position and method of HUD information based on external situation information of a front object.

According to the present embodiment, HUD information may be adaptively displayed at multiple image forming distances to improve the usability and marketability of the HUD device for a vehicle.

According to the present embodiment, the usability and marketability of the HUD device for a vehicle may be improved by varying the display position and method of HUD information based on external situation information of a front object.

It will be appreciated by persons skilled in the art that that the effects that could be achieved with the present disclosure are not limited to what has been particularly described hereinabove and other advantages of the present disclosure will be more clearly understood from the detailed description.

It will be apparent to those skilled in the art that various modifications and variations can be made in the present disclosure without departing from the spirit or scope of the inventions. Thus, it is intended that the present disclosure cover the modifications and variations of this invention provided they come within the scope of the appended claims and their equivalents.

What is claimed is:

1. A head-up display (HUD) device for a vehicle, comprising:
   a sensor configured to detect a front object of the vehicle;
   a controller configured to select any one region of a display region preset based on a driver's gaze as a target region for displaying HUD information depending on an overlapping position and a degree of overlap between the display region and the front object, and to determine a virtual image forming position of the HUD information and a graphics mode for displaying a virtual image depending on a relative position of the target region in the display region;
   an HUD generator configured to generate the HUD information according to the determined graphics mode; and
   an HUD adjuster configured to adjust an image forming distance of the HUD information according to the virtual image forming position,
   wherein:
   the display region includes a first display region defined by a first guide line corresponding to a first image forming distance of the HUD information, a second display region defined by a second guide line corresponding to a second image forming distance of the HUD information, and a third display region defined by a third guide line corresponding to a third image forming distance of the HUD information,
   when the overlap ratio between the first display region and the specific position of the front object is equal to or greater than a preset ratio (%), the controller selects the first display region as the target region and determines the graphics mode as a first mode based on augmented reality (AR),
   when the overlap ratio between the second display region and the specific position of the front object is equal to or greater than the preset ratio, the controller selects the second display region as the target region and determines the graphics mode as the first mode, and
   when the overlap ratio between the second display region and the specific position of the front object is less than the preset ratio, the controller selects the third display region as the target region and determines the graphics mode as a second mode that is not related to the AR.

2. The HUD device of claim 1, wherein:
   the sensor senses a distance and an angle between the vehicle and the front object and outputs sensed information as external situation information, and
   the controller calculates the overlapping position and the degree of overlap between the display region and the front object based on the external situation information.

3. The HUD device of claim 2, wherein:
   the display region is configured in an equilateral trapezoidal shape having a short side, a long side, and one pair of opposite sides having the same length,
   the short side is positioned at a first distance from a windshield of the vehicle,
   the long side is positioned at a second distance from the windshield of the vehicle, and
   the first distance is shorter than the second distance.

4. The HUD device of claim 3, wherein:
   the first image forming distance is longer than the second image forming distance, and the second image forming distance is longer than the third image forming distance, and
   a first distance between the first display region and the windshield of the vehicle is longer than a second distance between the second display region and the windshield of the vehicle, and the second distance is longer than a third distance between the third display region and the windshield of the vehicle.

5. The HUD device of claim 4, wherein the controller calculates an overlap ratio between each of the first and second display regions and a specific position of the front object based on the external situation information.

6. The HUD device of claim 1, wherein the preset ratio is any one of a range from 20% to 100%.

7. The HUD device of claim 1, wherein:
   in the first mode, a display position of the HUD information is changed in the first display region or the second display region along the front object that is moving for matching the display position with the front object; and in the second mode, the display position of the HUD information is fixed to a specific position in the third display region regardless of a position of the front object that is moving.

8. The HUD device of claim 1, further comprising:
an internal memory configured to classify the HUD information for each category depending on an HUD event,
wherein the controller determines a category in the internal memory, to which the HUD information belongs, calculates the overlap ratio only for displaying some categories, and omits an operation of calculating the overlap ratio for displaying remaining categories.

9. The HUD device of claim 8, wherein the controller performs control to display any one of the first to third display regions depending on whether first HUD information belonging to a first category is matched with a display region at the overlap ratio, performs control to display any one of the first to third display regions depending on whether second HUD information belonging to a second category is matched with a display region at the overlap ratio, and performs control to display third HUD information belonging to a third category only in the third display region regardless of the overlap ratio.

10. A head-up display (HUD) displaying method for a vehicle, the method comprising:
detecting a front object of the vehicle and generating external situation information;
calculating an overlapping position and a degree of overlap between a display region preset based on a driver's gaze and the front object based on the external situation information;
selecting any one region of the display region as a target region for displaying HUD information depending on the overlapping position and the degree of overlap, and determining a virtual image forming position of the HUD information and a graphics mode for displaying a virtual image depending on a relative position of the target region in the display region;
generating the HUD information according to the determined graphics mode; and
adjusting an image forming distance of the HUD information according to the virtual image forming position,
wherein the display region includes a first display region defined by a first guide line corresponding to a first image forming distance of the HUD information, a second display region defined by a second guide line corresponding to a second image forming distance of the HUD information, and a third display region defined by a third guide line corresponding to a third image forming distance of the HUD information, and
wherein the selecting and the determining includes:
when the overlap ratio between the first display region and the specific position of the front object is equal to or greater than a preset ratio (%), selecting the first display region as the target region and determining the graphics mode as a first mode based on augmented reality (AR);
when the overlap ratio between the second display region and the specific position of the front object is equal to or greater than the preset ratio, selecting the second display region as the target region and determining the graphics mode as the first mode; and
when the overlap ratio between the second display region and the specific position of the front object is less than the preset ratio, selecting the third display region as the target region and determining the graphics mode as a second mode that is not related to the AR.

11. The method of claim 10, wherein the external situation information includes a distance and an angle between the vehicle and the front object.

12. The method of claim 11, wherein:
the display region is configured in an equilateral trapezoidal shape having a short side, a long side, and one pair of opposite sides having the same length,
the short side is positioned at a first distance from a windshield of the vehicle,
the long side is positioned at a second distance from the windshield of the vehicle, and
the first distance is shorter than the second distance.

13. The method of claim 12, wherein:
the first image forming distance is longer than the second image forming distance, and the second image forming distance is longer than the third image forming distance, and
a first distance between the first display region and the windshield of the vehicle is longer than a second distance between the second display region and the windshield of the vehicle, and the second distance is longer than a third distance between the third display region and the windshield of the vehicle.

14. The method of claim 13, wherein the calculating includes calculating an overlap ratio between each of the first and second display regions and a specific position of the front object.

15. The method of claim 10, wherein the preset ratio is any one of a range from 20% to 100%.

16. The method of claim 10, wherein:
in the first mode, a display position of the HUD information is changed in the first display region or the second display region along the front object that is moving for matching with the front object; and
in the second mode, the display position of the HUD information is fixed to a specific position in the third display region regardless of a position of the front object that is moving.

17. The method of claim 10, further comprising:
accessing an internal memory configured to classify the HUD information for each category depending on an HUD event;
determining a category in the internal memory, to which the HUD information belongs; and
as a result of the determining, calculating the overlap ratio only for displaying some categories, and omitting an operation of calculating the overlap ratio for displaying remaining categories.

18. The method of claim 17, wherein, as the result of the determining, the calculating and the omitting includes:
performing control to display any one of the first to third display regions depending on whether first HUD information belonging to a first category is matched with a display region at the overlap ratio;
performing control to display any one of the first to third display regions depending on whether second HUD information belonging to a second category is matched with a display region at the overlap ratio; and
performing control to display third HUD information belonging to a third category only in the third display region regardless of the overlap ratio.

* * * * *